United States Patent
Park et al.

(10) Patent No.: US 9,741,155 B2
(45) Date of Patent: Aug. 22, 2017

(54) APPARATUS AND METHOD FOR TILE-BASED GRAPHIC DATA RENDERING

(71) Applicant: Samsung Electronics Co., Ltd., Suwon-si (KR)

(72) Inventors: Jeong-soo Park, Gwacheon-si (KR); Kwon-taek Kwon, Seoul (KR); Jeong-ae Park, Seoul (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 137 days.

(21) Appl. No.: 14/335,207

(22) Filed: Jul. 18, 2014

(65) Prior Publication Data

US 2015/0228113 A1 Aug. 13, 2015

(30) Foreign Application Priority Data

Feb. 12, 2014 (KR) .................... 10-2014-0016283

(51) Int. Cl.
*G06T 15/00* (2011.01)
*G06T 11/40* (2006.01)

(52) U.S. Cl.
CPC ............ *G06T 15/005* (2013.01); *G06T 11/40* (2013.01)

(58) Field of Classification Search
CPC .................................................... G06T 15/06
See application file for complete search history.

(56) References Cited

U.S. PATENT DOCUMENTS

| | | | | |
|---|---|---|---|---|
| 5,583,975 A * | 12/1996 | Naka | ...................... | G06T 15/06 345/424 |
| 6,064,407 A | 5/2000 | Rogers | | |
| 6,975,318 B2 | 12/2005 | Junkins et al. | | |
| 7,561,155 B1 * | 7/2009 | Gardiner | ................. | G06T 11/40 345/420 |
| 2003/0169269 A1* | 9/2003 | Sasaki | .................. | G06F 9/5066 345/581 |
| 2004/0100465 A1* | 5/2004 | Stowe | ..................... | G06T 15/00 345/427 |
| 2005/0041031 A1* | 2/2005 | Diard | .................... | G06T 15/005 345/505 |
| 2005/0149251 A1* | 7/2005 | Donath | .................. | G01C 21/26 701/532 |
| 2008/0079734 A1* | 4/2008 | Shearer | .................. | G06T 15/06 345/505 |
| 2011/0057935 A1 | 3/2011 | Fowler | | |
| 2011/0283086 A1* | 11/2011 | Mejdrich | .............. | G06F 9/3802 712/30 |

(Continued)

FOREIGN PATENT DOCUMENTS

KR 10-2007-0058548 A 6/2007
KR 10-2008-0010361 A 1/2008

(Continued)

*Primary Examiner* — Daniel Hajnik
(74) *Attorney, Agent, or Firm* — Harness, Dickey & Pierce, PLC

(57) ABSTRACT

A method and apparatus for rendering graphics data are provided. The graphics data rendering method includes calculating a number of overlapping objects by tile in a first frame. The graphics data rendering method determines a tile size of a second frame based on the calculated number of the overlapping objects, divides the second frame based on the determined tile size, and renders the second frame by divided tile.

15 Claims, 8 Drawing Sheets

(56) References Cited

U.S. PATENT DOCUMENTS

| | | | | |
|---|---|---|---|---|
| 2012/0133656 | A1* | 5/2012 | McKenzie | G06T 15/06 345/424 |
| 2013/0069943 | A1* | 3/2013 | Kallio | G06T 15/005 345/420 |
| 2014/0270344 | A1* | 9/2014 | Krishnamoorthi | G06K 9/6211 382/103 |

FOREIGN PATENT DOCUMENTS

| | | |
|---|---|---|
| KR | 10-0885875 B1 | 2/2009 |
| KR | 10-1140460 B1 | 4/2012 |

* cited by examiner

APPARATUS AND METHOD FOR TILE-BASED GRAPHIC DATA RENDERING

CROSS-REFERENCE TO RELATED APPLICATION(S)

This application claims the benefit under 35 U.S.C. §119(a) of Korean Patent Application No. 10-2014-0016283, filed on Feb. 12, 2014, in the Korean Intellectual Property Office, the disclosure of which is incorporated herein in its entirety by reference.

BACKGROUND

1. Field

The following description relates to graphics rendering methods and apparatuses, and a recording medium.

2. Description of Related Art

A graphics data processing system calculates an in-screen position of an object composing a screen in graphics data with three-dimensional (3D) coordinates, to display the graphics data on the screen. Also, the graphics data processing system performs an arithmetic operation of determining a color of a stored object and stores a color value, determined based on a result of the arithmetic operation.

The graphics data processing system divides each frame of graphics data into a plurality of tiles and renders each of the divided tiles to improve use power and a memory bandwidth. The graphics data processing system stores information of an object, included in each tile, in an internal memory by tile. However, such graphics data processing system may not consider a density of an object in each frame thereby causing an increase in a rendering load. Another art graphics data processing system divides a frame into tiles having a certain size and renders each of the divided tiles, without considering a size and distribution of an object included in the frame. When dividing a frame into tiles having a certain size and rendering each of the divided tiles, objects may be concentrated in a certain tile among a plurality of tiles constituting the frame, causing an increase in a rendering load.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an illustrative example, there is provided a graphics data rendering method, including calculating a number of overlapping objects by tile in a first frame; determining a tile size of a second frame based on the calculated number of the overlapping objects; dividing the second frame based on the determined tile size; and rendering the second frame by divided tile.

The second frame may be a frame onto which rendering is performed after the first frame.

The calculating of the number of overlapping objects may include adding number of overlapping objects in each tile of the first frame.

The determining of the tile size may include decreasing the tile size in response to a number of the added objects exceeding a range; and increasing the tile size in response to the number of the added objects being less than the range.

The calculating of the number of overlapping objects may include calculating an average number of overlapping objects in each tile of the first frame.

The determining of the tile size may include decreasing the tile size in response to the calculated average number exceeding a range; and increasing the tile size in response to the calculated average number being less than the range.

The determining of the tile size may include comparing the calculated number of the overlapping objects and stored tile size information that corresponds to the number of overlapping objects by tile; and determining the tile size of the second frame based on the tile size information corresponding to the calculated number of the overlapping objects.

In accordance with another illustrative example, there is provided a graphics data rendering apparatus, including a calculation unit configured to calculate a number of overlapping objects by tile in a first frame; a tile size determining unit configured to determine a tile size of a second frame based on the calculated number of the overlapping objects; and a rendering unit configured to divide the second frame based on the determined tile size and render the second frame by divided tile.

The second frame may be a frame for which rendering is performed after the first frame.

The calculation unit may add number of overlapping objects in each tile of the first frame.

The tile size determining unit may decrease the tile size in response to a number of the added objects exceeding a range, and the tile size determining unit may increase the number of the added objects being less than the range.

The calculation unit may calculate an average number of overlapping objects in each tile of the first frame.

The tile size determining unit may decrease the tile size in response to the calculated average number exceeding a range. The tile size determining unit may increase the tile size in response to the calculated average number being equal to or less than the range.

The tile size determining unit may compare the calculated number of the overlapping objects and stored tile size information that corresponds to the number of the overlapping objects by tile, and determine the tile size of the second frame based on the tile size information corresponding to the calculated number of the overlapping objects.

In accordance with an illustrative example, there is provided a non-transitory computer-readable storage medium storing a program for executing the graphics data rendering method described above.

In accordance with another illustrative example, there is provided a graphics data rendering method, including calculating a number of overlapping objects in a first frame; comparing the number of the overlapping objects in the first frame against a range; and determining whether to modify or to maintain a tile size of a second frame depending on the number of the overlapping objects against the range.

The method may also include increasing the tile size of the second frame compared to the tile size of the first frame in response to the number of the overlapping objects in the first frame being less than the range.

The method may also include maintaining the tile size of the second frame same to the tile size of the first frame in response to the number of the overlapping objects in the first frame being within the range.

The method may also include decreasing the tile size of the second compared to the tile size of the first frame in response to the number of the overlapping objects in the first frame being greater than the range.

The number of overlapping objects may be a total number of the overlapping objects in the first frame or an average number of the overlapping objects per tile of the first frame.

Other features and aspects may be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which.

Figure 1:
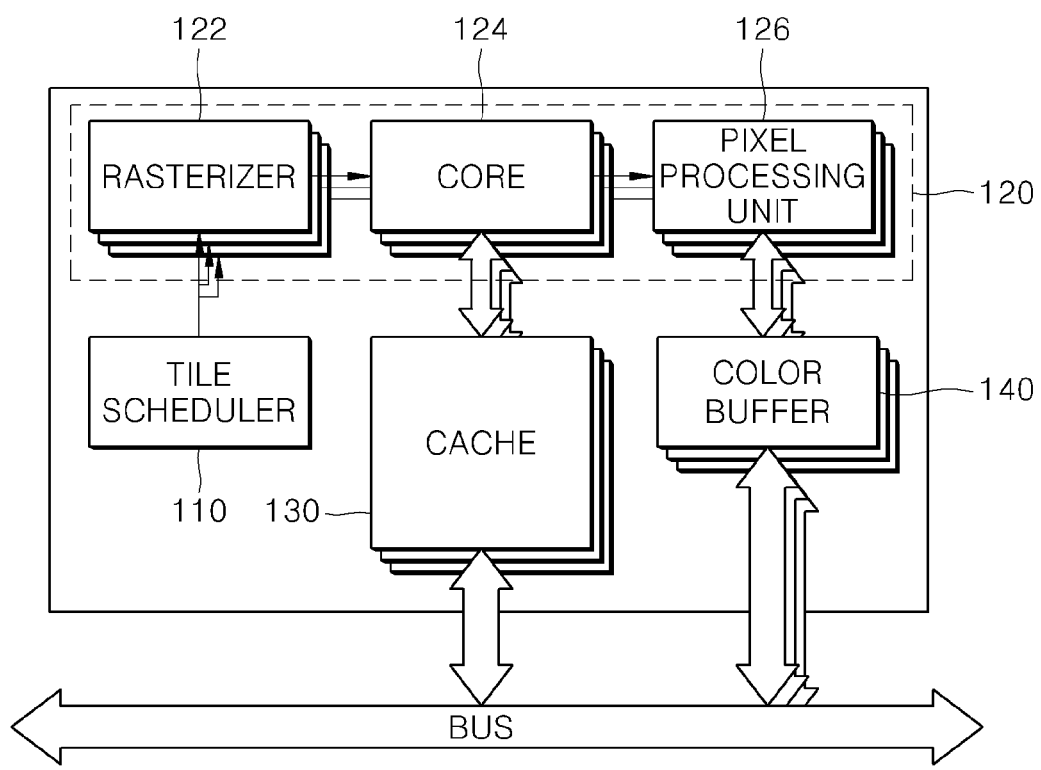
FIG. 1 is a diagram illustrating a tile-based graphics data rendering system, in accordance with an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

It will be understood that when an element or layer is referred to as being "on" or "connected to" another element or layer, it can be directly on or connected to the other element or layer or through intervening elements or layers may be present. In contrast, when an element is referred to as being "directly on" or "directly connected to" another element or layer, there are no intervening elements or layers present. Like reference numerals refer to like elements throughout. As used herein, the term "and/or" includes any and all combinations of one or more of the associated listed items.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. These terms do not necessarily imply a specific order or arrangement of the elements, components, regions, layers and/or sections. Thus, a first element, component, region, layer or section discussed below could be termed a second element, component, region, layer or section without departing from the teachings description of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). Furthermore, when it is described that one comprises (or includes or has) some elements, it should be understood that it may comprise (or include or has) only those elements, or it may comprise (or include or have) other elements as well as those elements if there is no specific limitation.

FIG. 1 is a diagram illustrating a tile-based graphics data rendering system 100, in accordance with an embodiment. It may be understood by those skilled in the art that the tile-based graphics data rendering system 100 may further include general-use elements in addition to the elements of FIG. 1.

Referring to FIG. 1, the tile-based graphics data rendering system 100 includes a tile scheduler 110, at least one pixel channel 120, a cache 130, and a color buffer 140.

The tile-based graphics data rendering system 100 divides a frame into tiles, each having a certain size. The tile-based graphics data rendering system 100 distributes each of the tiles to the at least one pixel channel 120 and renders each tile. The frame may include image-unit graphics data, which is displayed on a screen.

The tile scheduler 110 distributes the tiles to the at least one pixel channel 120.

The pixel channel 120 includes a rasterizer 122, a core 114, and a pixel processing unit 126. The rasterizer 122 interpolates screen coordinates and texture coordinates, which are defined at each vertex in a primitive, to generate information of a pixel added into the primitive.

The core 124 performs texture mapping of the screen image and calculate the amount of reflected light, based on image information which is stored in an external memory through the cache 130. The pixel processing unit 126 determines a color of a pixel based on the calculation result of the core 124.

The color buffer 140 stores a color value of each pixel determined by the pixel channel 120.

In order to perform the above-described tile-based graphics rendering operation, before distributing a tile to the pixel channel 120, the graphics data rendering system 100 divides a frame into a plurality of tiles having a predefined or predetermined size.

A graphics data rendering method, according to an embodiment, includes a method that determines a tile size to classify graphics data, based on a characteristic of the graphics data. Hereinafter, the method to determine a size of graphics data of a tile, according to an embodiment, will be described in detail.

Figure 2:
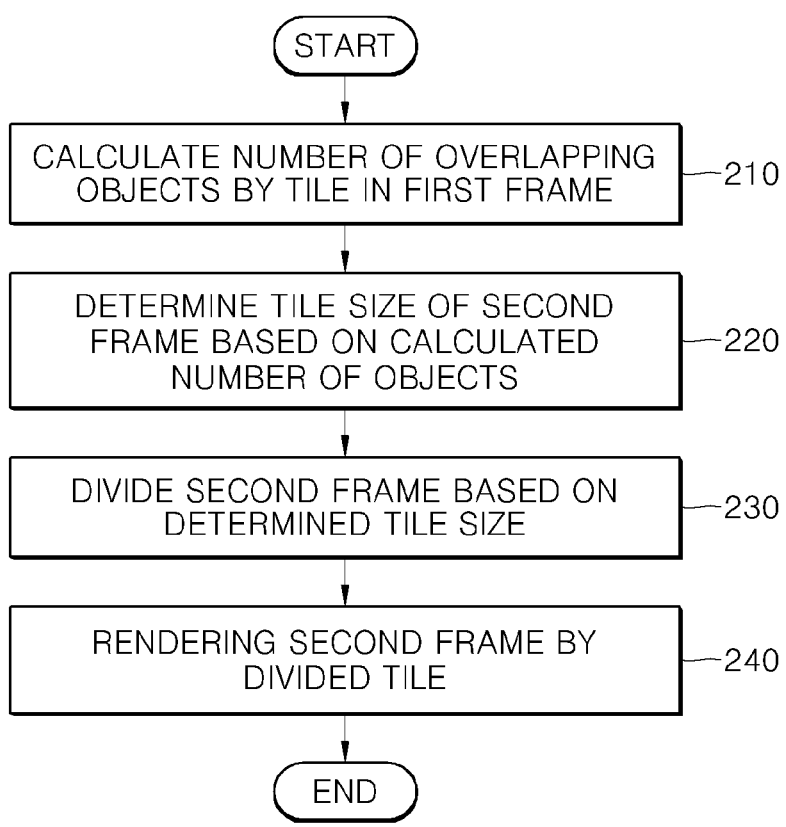
FIG. 2 is a flowchart of a graphics data rendering method, in accordance with an embodiment.

FIG. 2 is a flowchart of a graphics data rendering method, according to an embodiment.

In operation 210, the graphics data rendering method calculates the number of overlapping objects by tile in a first frame. In one illustrative example, graphics data includes 3D coordinates, indicates a position of each vertex, and a texture and texture coordinates, which define texture information drawn on a surface of a face composed of the 3D vertex coordinates. Also, the graphics data includes additional information, for example, normal information and map information, which is necessary to more realistically or unrealistically represent rendering, in accord with a user's intention. The graphics data may also include index information, which defines a manner in which coordinates of a vertex are connected. The first frame may include graphics data displayed on a screen at a first timing.

The graphics data rendering method divides a first frame into a plurality of tiles, and renders each of the divided tiles. Referring to FIG. 1, in the graphics data rendering apparatus, tile information of a first frame is divided according to a predetermined tile size and is transmitted to the tile scheduler 110. The tile scheduler 110 distributes a plurality of divided tiles to the at least one pixel channel 120, based on the divided tile information. The graphics data rendering apparatus divides the first frame into a plurality of tiles having a predetermined size.

The graphics data rendering apparatus calculates the number of overlapping objects per each of the tiles having the predetermined size and into which the first frame is divided.

Referring back to FIG. 2, in operation 220, the graphics data rendering method determines a tile size of a second frame, based on the calculated number of objects. The graphics data rendering method determines the tile size of the second frame, based on a result obtained by adding overlapping objects in the respective tiles included in the first frame. For example, when a total number of the added objects exceeds a predetermined range, the graphics data rendering method decreases the tile size of the second frame. On the other hand, when the number of the added objects is less than the predetermined range, the graphics data rendering method increases the tile size of the second frame. In addition, when the number of the added objects is within the predetermined range, the graphics data rendering method determines the tile size of the second frame to the same size as the tile size of the first frame.

A graphics data rendering apparatus and corresponding method, in accord with an alternative embodiment, determines a tile size of the second frame, based on an average number of overlapping objects in the tiles included in the first frame. For example, when the average number of the overlapping objects in the tiles included in the first frame exceeds the predetermined range, the graphics data rendering apparatus and method thereof decreases the tile size of the second frame. On the other hand, when the average number of the overlapping objects in the tiles included in the first frame is less than the predetermined range, the graphics data rendering apparatus and method thereof increases the tile size of the second frame. In addition, when the average number of the overlapping objects in the respective tiles included in the first frame is within the predetermined range, the graphics data rendering apparatus and method thereof determine the tile size of the second frame to the same size as the tile size of the first frame.

A database included in the graphics data rendering apparatus stores tile size information which includes a preset tile size that corresponds to the number of overlapping objects. For example, the graphics data rendering apparatus stores tile size information. Based on the stored tile size information, when the number of overlapping objects is less than three, the graphics data rendering apparatus sets the tile size to a, and when the number of overlapping objects is equal to or greater than three and less than six, the graphics data rendering apparatus sets the tile size to b. The graphics data rendering apparatus extracts tile size information, corresponding to the number of overlapping objects per tile as calculated from the first frame, from the database to determine the tile size of the second frame.

In operation 230, the graphics data rendering method divides the second frame, based on the determined tile size. When the determined tile size differs from the tile size of the first frame, the graphics data rendering method updates the tile size according to which the second frame will be divided, based on stored division information. The graphics data rendering method divides the second frame, based on an updated tile size.

When the determined tile size is the same as the tile size of the first frame, the graphics data rendering method maintains the stored division information. The graphics data rendering method divides the second frame according to a tile size that is equal to the tile size of the first frame.

In operation 240, the graphics data rendering method renders the second frame by divided tile.

The graphics data rendering method transmits information about the divided tiles of the second frame to the tile scheduler 110. In one example, the information about the divided tiles of the second frame include size information of each of the divided tiles and index information including identification information to identify each of the tiles. The tile scheduler 110 (see FIG. 1) distributes a tile composing the second frame to the at least one pixel channel 120, based on the transmitted information about the divided tiles of the second frame.

The graphics data rendering method, using the rasterizer 122 included in the at least one pixel channel 120, interpolates screen coordinates and texture coordinates, which are defined at each vertex in a primitive included in the distributed tile, to generate information of a pixel added into the primitive.

The graphics data rendering method, using the core 124, performs the texture mapping of the screen image and calculates the amount of reflected light, based on the image information which is stored in the external memory through the cache 130. The graphics data rendering method, using the pixel processing unit 126, to determine a color of a pixel, based on the calculation result of the core 124.

The graphics data rendering method, using the at least one pixel channel 120, determines a color value of each of a plurality of pixels included in the distributed tile.

The graphics data rendering apparatus and corresponding method, in accord with an embodiment, determines a tile size of a current frame, based on a calculated number of overlapping objects per tile of a previous frame. For example, the graphics data rendering apparatus determines a tile size of a third frame (which is a current frame), based on the number of overlapping objects by tile which is calculated from the second frame that is a previous frame.

Figure 3:
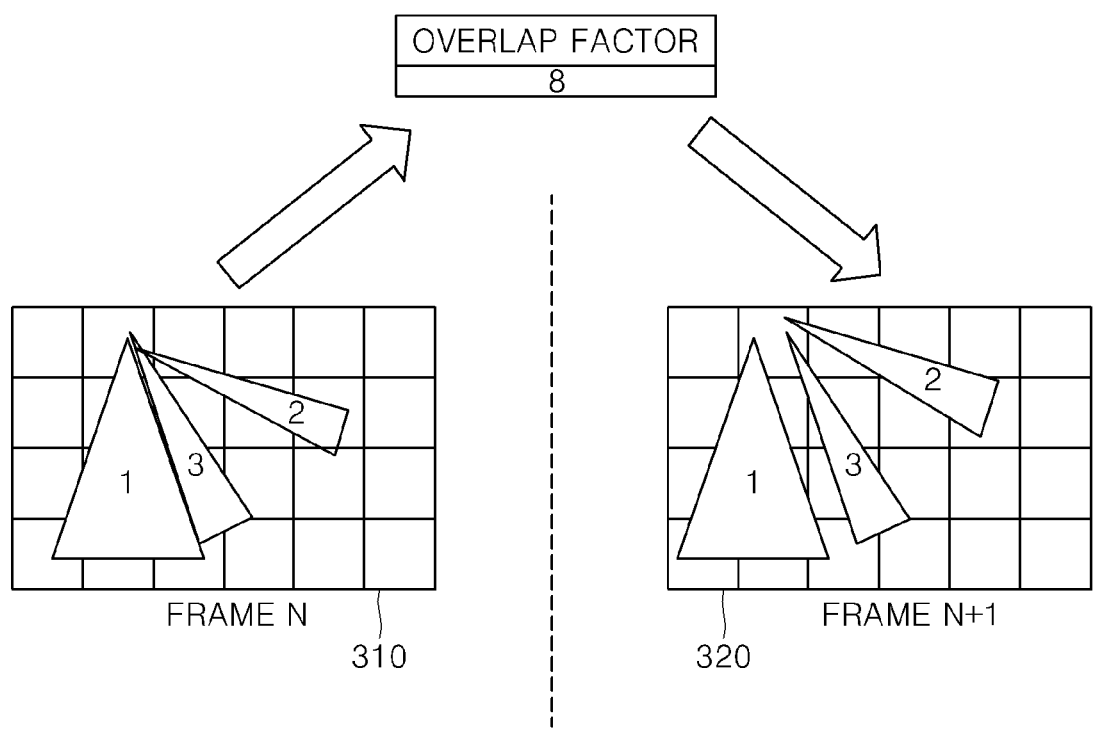
FIG. 3 is a diagram of a method determining a tile size of a current frame based on a tile size of a previous frame, in accordance with an embodiment.

FIG. 3 is a diagram of, in detail, a method of determining a tile size of a current frame based on a tile size of a previous frame, in accord with an embodiment.

Referring to FIG. 3, the graphics data rendering apparatus calculates the number of overlapping objects in a tile in an Nth frame that is a previous frame. The graphics data rendering apparatus calculates an overlap factor including information about the number of overlapping objects in a tile in the Nth frame. The overlap factor may be calculated using various methods.

In the embodiment of FIG. 3, for each tile including an object, the graphics data rendering apparatus calculates the number of overlapping objects included in the tile to calculate an overlap factor. For example, when three objects overlap in one tile, the number of overlapping objects included in the one tile may be calculated as two. When two objects overlap in one tile, the number of overlapping objects included in the one tile may be calculated as one. In this way, in FIG. 3, an overlap factor of the Nth frame is eight, as a addition result of overlapping objects included in each tile.

When the overlap factor of the Nth frame exceeds a predetermined range, the graphics data rendering apparatus increases a tile size of an $N+1^{st}$ frame with respect to a tile size of the $N^{th}$ frame. On the other hand, when the overlap factor of the Nth frame is equal to or less than the predetermined range, the graphics data rendering apparatus decreases the tile size of the $N^{th}$ frame with respect to the tile size of an $N+1^{st}$ frame. In addition, when the overlap factor of the $N^{th}$ frame is within the predetermined range, the graphics data rendering apparatus sets the tile size of the $N+1^{st}$ frame to be identical the tile size of the $N^{th}$ frame.

Referring to FIG. 3, the overlap factor of the Nth frame is equal to or greater than five and less than ten, which is within the predetermined range. As a result, the graphics data rendering apparatus and method thereof maintain the tile size of the $N+1^{st}$ frame to be the same as the tile size of the $N^{th}$ frame.

Figure 4:
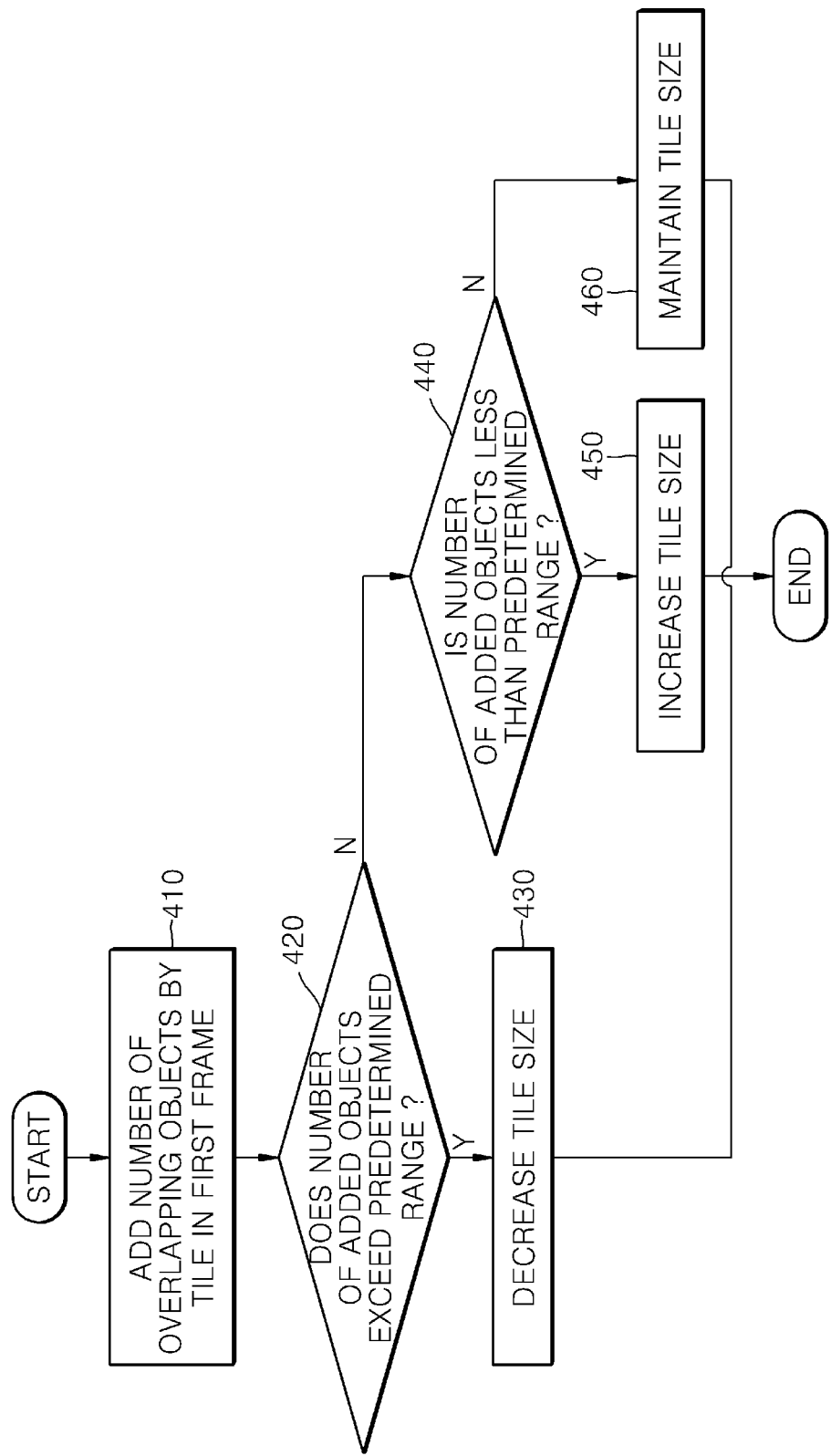
FIG. 4 is a flowchart of a method calculating a total sum of overlapping objects by tile of the previous frame, in accordance with an embodiment.

FIG. 4 is a flowchart of a method of calculating a total number of overlapping objects included in a previous frame, based on the number of overlapping objects in each tile of the previous frame, according to an embodiment. In one illustrative example, the graphics data rendering apparatus of FIG. 1 may be configured to execute the operations of the graphics data rendering method described below and associated with FIG. 4.

In operation 410, the graphics data rendering method calculates the total number of overlapping objects included in a first frame. For example, when the number of overlapping objects in an nth tile, among a plurality of tiles, included in the first frame is three, the number of overlapping objects in an $n+1^{th}$ tile is two, and the number of overlapping objects in an $n+2^{th}$ tile is four, the total number of overlapping objects in first frame is nine.

In operation 420, the graphics data rendering method determines whether the number of the added objects exceeds or is greater than a predetermined range. In one illustrative example, the predetermined range is set by a user or automatically set, based on a feature of rendered graphics data and a performance of the graphics data rendering apparatus and method thereof that performs rendering.

In operation 430, the graphics data rendering method decreases a tile size of a second frame compared to a tile size of the first frame. In response to the number of the added objects in the first frame exceeds the predetermined range, the graphics data rendering method decreases the tile size of the second frame compared to the tile size of the first frame. When the number of overlapping objects exceeds the predetermined range, the graphics data rendering method estimates a complexity of graphics data as high. In one illustrative example, the complexity of the graphics data is determined based on a size and distribution degree of a primitive included in the graphics data. For example, when the primitive included in the graphics data is intensively distributed in a certain region, the complexity of the graphics data may be high in the certain region.

The graphics data rendering method decreases the tile size of the second frame to distribute a rendering load of the at least one pixel channel 120. In response to the tile size of the second frame being reduced, the number of overlapping objects in one tile is reduced. As a result, in response to one pixel channel performing rendering, the number of times stored primitive information is called may be reduced. A rendering load to be processed by one pixel channel may be reduced.

The graphics data rendering method determines a tile size based on a degree to which the number of added overlapping objects exceeds the predetermined range. For example, in response to the degree of excess being less than three, the graphics data rendering method changes the tile size to 0.8 times the tile size of the first frame, and when the degree of excess is equal to or greater than three and less than six, the graphics data rendering method changes the tile size to 0.6 times the tile size of the first frame. However, the present embodiment is not limited thereto.

According to another embodiment, the graphics data rendering method determines the tile size of the second frame, based on a tile size (corresponding to the number of added overlapping objects) stored in the database.

In operation 440, the graphics data rendering method determines whether the number of added objects is less than the predetermined range.

In operation 450, the graphics data rendering method increases the tile size of the second frame compared to the tile size of the first frame. In response to the number of added overlapping objects in the first frame being less than the predetermined range, the graphics data rendering method increases the tile size of the second frame compared to the tile size of the first frame. When the number of overlapping objects is less than the predetermined range, the graphics data rendering method estimates a complexity of graphics data as low.

The graphics data rendering method, in accord with an illustrative example, increases the tile size of the second frame so that overlapping objects are concentrated to a certain tile. In this case, inefficiency in which a desired number or more of pixel channels perform rendering is reduced. When the tile size of the second frame increases, the number of overlapping objects is concentrated on a certain tile and the number of pixel channels that perform rendering decreases.

The graphics data rendering method determines a tile size based on a difference between the number of added overlapping objects and the predetermined range. For example, in response to the difference between the ABC and the predetermined range being less than three, the graphics data rendering method increases the tile size by 1.2 times, and in response to the difference with the predetermined range being equal to or greater than three and less than six, the graphics data rendering apparatus may increase the tile size by 1.4 times. However, the present embodiment is not limited thereto.

According to another embodiment, the graphics data rendering method determines the tile size of the second frame, based on the tile size (corresponding to the number of added overlapping objects) stored in the database.

In operation 460, the graphics data rendering method maintains the tile size of the second frame identically to the tile size of the first frame. In response to the number of added overlapping objects in the first frame being within the predetermined range, the graphics data rendering method maintains the tile size of the second frame identically to the tile size of the first frame.

Figure 5:
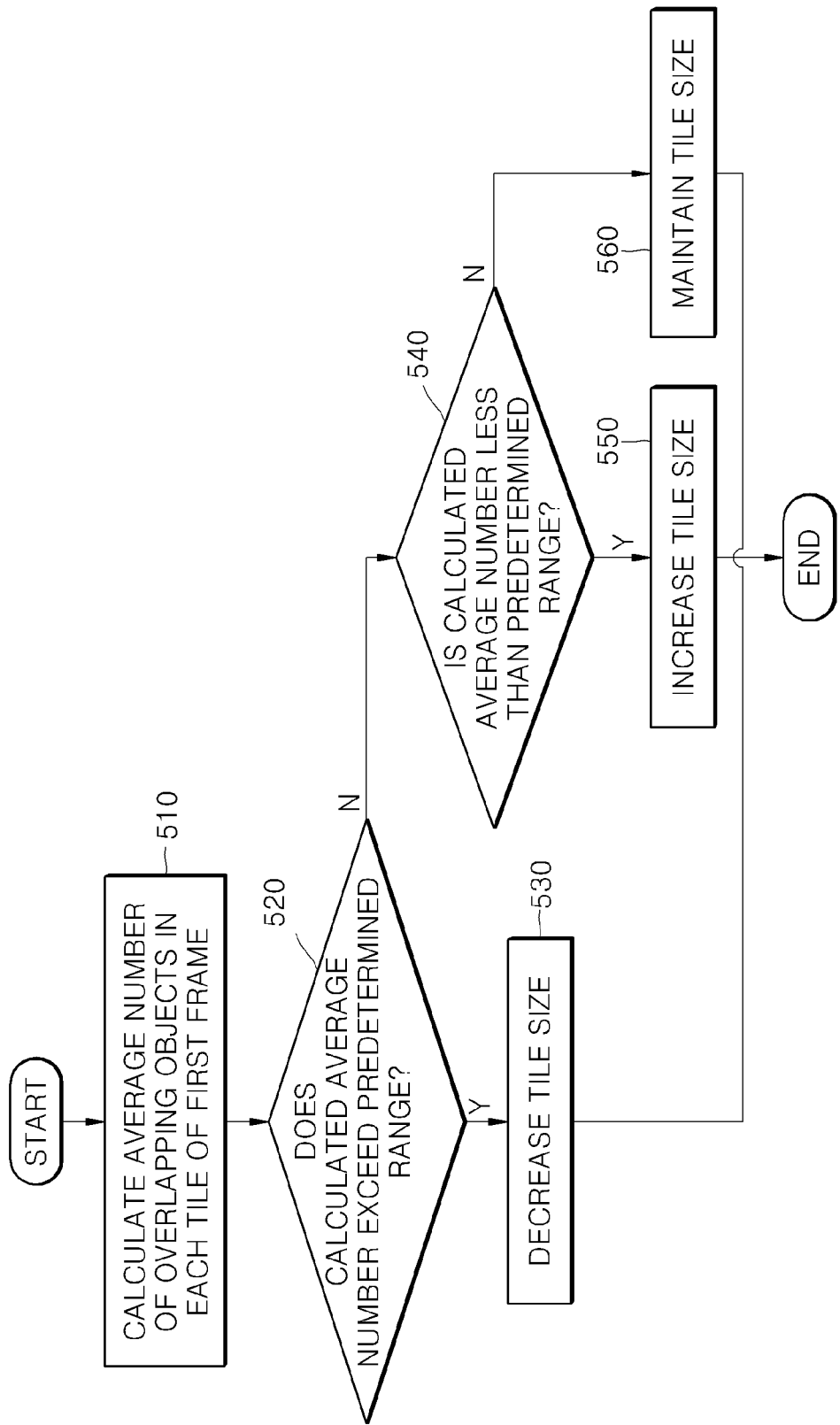
FIG. 5 is a flowchart of a method calculating an average number of overlapping objects by tile of the previous frame, in accordance with an embodiment.

FIG. 5 is a flowchart of a method calculating the average number of overlapping objects per tile of a previous frame, according to an embodiment. In one illustrative example, the graphics data rendering apparatus of FIG. 1 may be configured to execute the operations of the graphics data rendering method described below and associated with FIG. 5.

In operation 510, the graphics data rendering method calculates the average number of overlapping objects per tile of a first frame. For example, when the number of overlapping objects in an nth tile among a plurality of tiles included in the first frame is three, the number of overlapping objects in an $n+1^{st}$ tile is two, and the number of overlapping objects in a $2n^{th}$ tile is four, the average number of overlapping objects per tile is three.

In operation 520, the graphics data rendering method determines whether the average number of overlapping objects per tile exceeds a predetermined range. In one illustrative example, the predetermined range is set by a user or automatically set, based on a feature of rendered graphics data and a performance of the graphics data rendering method that performs rendering.

In operation 530, the graphics data rendering method decreases the tile size of a second frame compared to the tile size of the first frame. In response to the average number of overlapping objects calculated in the first frame exceeding the predetermined range, the graphics data rendering method decreases the tile size of the second frame compared to the tile size of the first frame.

The graphics data rendering method determines a tile size based on a degree to which the average number of overlapping objects per tile of the second frame exceeds the predetermined range. For example, in response to the degree of excess is less than four, the graphics data rendering method changes the tile size to 0.7 times the tile size of the first frame. In response to the degree of excess being equal to or greater than four and less than eight, the graphics data rendering method changes the tile size to 0.5 times the tile size of the first frame. However, the present embodiment is not limited thereto.

According to another embodiment, the graphics data rendering method determines the tile size of the second frame, based on a tile size (corresponding to the average number of overlapping objects per tile of the second frame) stored in the database.

In operation 540, the graphics data rendering method determines whether the average number of overlapping objects per tile of the second frame is less than the predetermined range.

In operation 550, the graphics data rendering method increases the tile size of the second frame compared to the tile size of the first frame. In response to the average number of overlapping objects per tile of the first frame being less than the predetermined range, the graphics data rendering method increases the tile size of the second frame compared to the tile size of the first frame.

In accord with an embodiment, the graphics data rendering method determines a tile size based on a difference between the average number of overlapping objects per tile of the first frame and the predetermined range. For example, when the difference between the average number of overlapping objects per tile of the first frame and the predetermined range is less than four, the graphics data rendering method increases the tile size by 1.3 times. In response to the difference with the predetermined range being equal to or greater than four and less than eight, the graphics data rendering method increases the tile size by 1.5 times. However, the present embodiment is not limited thereto.

According to another embodiment, the graphics data rendering method determines the tile size of the second frame, based on a tile size (corresponding to the average number of overlapping objects in a frame) stored in the database.

In operation 560, the graphics data rendering method maintains the tile size of the second frame identically to the tile size of the first frame. In response to the average number of overlapping objects in the first frame being within the predetermined range, the graphics data rendering method maintains the tile size of the second frame identically to the tile size of the first frame.

Figure 6:
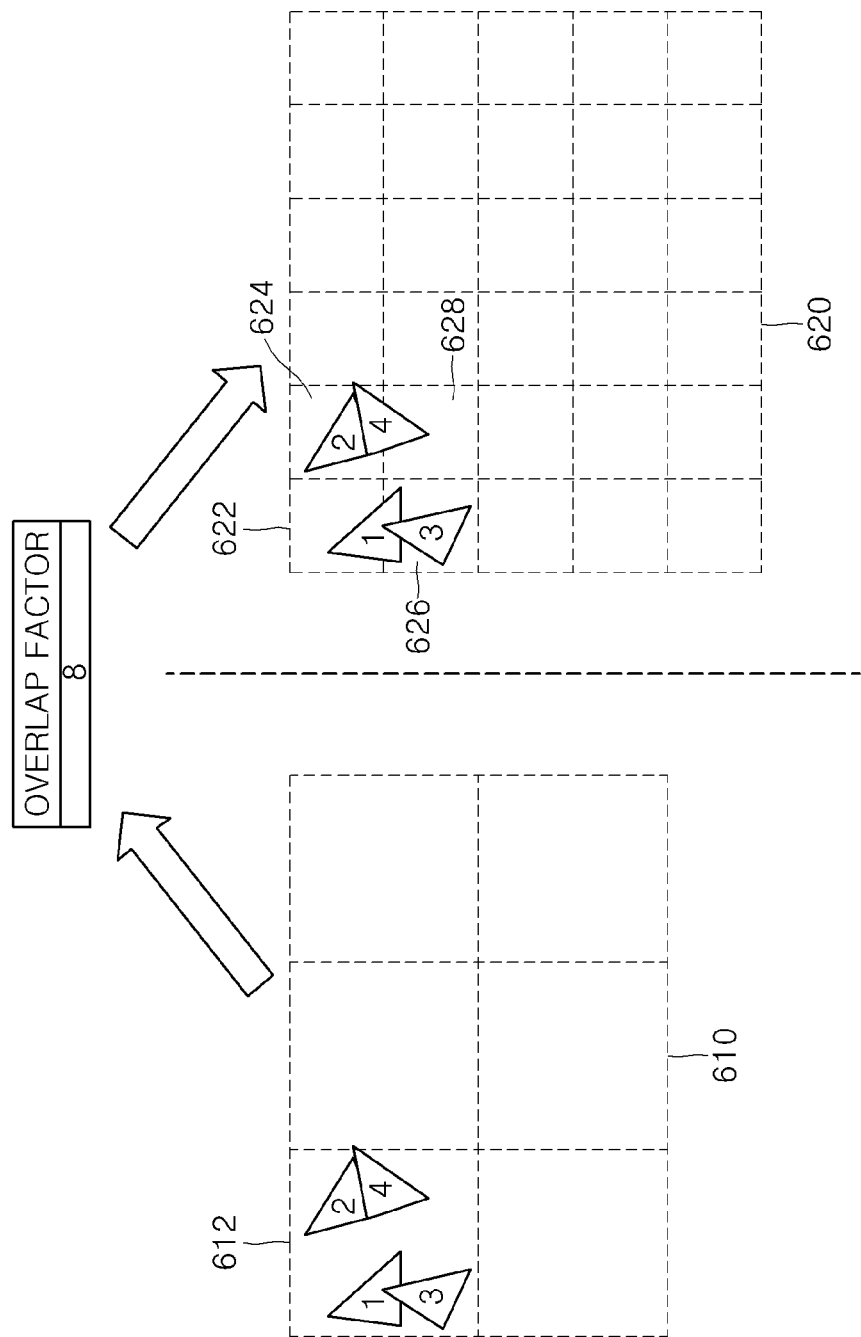
FIG. 6 is a diagram of a method of determining a tile size when the number of overlapping objects exceeds a range, in accordance with an embodiment.

FIG. 6 is a diagram of a method determining a tile size when the number of overlapping objects exceeds a predetermined range, according to an embodiment. In one illustrative example, the graphics data rendering apparatus of FIG. 1 may be configured to execute the operations of the graphics data rendering method described below and associated with FIG. 6.

Referring to FIG. 6, the number of overlapping objects in a first tile 612 of a first frame 610 is four. In the first frame 610, other than the four objects in the first tile 612, there are no objects in any of the other tiles. In this case, a rendering load is concentrated on a pixel channel to which the first tile 612 is allocated. Therefore, in response to the pixel channel rendering the first tile 612, the pixel channel reads information about the four objects included in the first tile 612 from a memory, and performs rendering. In this case, a rendering speed is inefficient.

The graphics data rendering method, in accord with an embodiment, decreases a tile size of a second frame 620, based on that the number of overlapping objects calculated in the first frame 610 exceeding a predetermined range. In continuous frames, characteristics of graphics data respectively constituting the frames are similar. As a result, the graphics data rendering method determines the tile size of the second frame 620, based on the number of overlapping objects calculated in the first frame 610.

The graphics data rendering method decreases the tile size of the second frame 620 compared to the tile size of the first frame 610. As shown in FIG. 6, as a tile size is reduced, a first tile 622 of the second frame 620 includes one object, a second tile 624 includes two objects, a third tile 626 includes two objects, and a fourth tile 628 includes one object. When a number of overlapping objects calculated in the first frame 610 exceeds the predetermined range, the graphics data rendering method decreases a tile size to reduce a load of rendering that is performed through a certain pixel channel.

Figure 7:
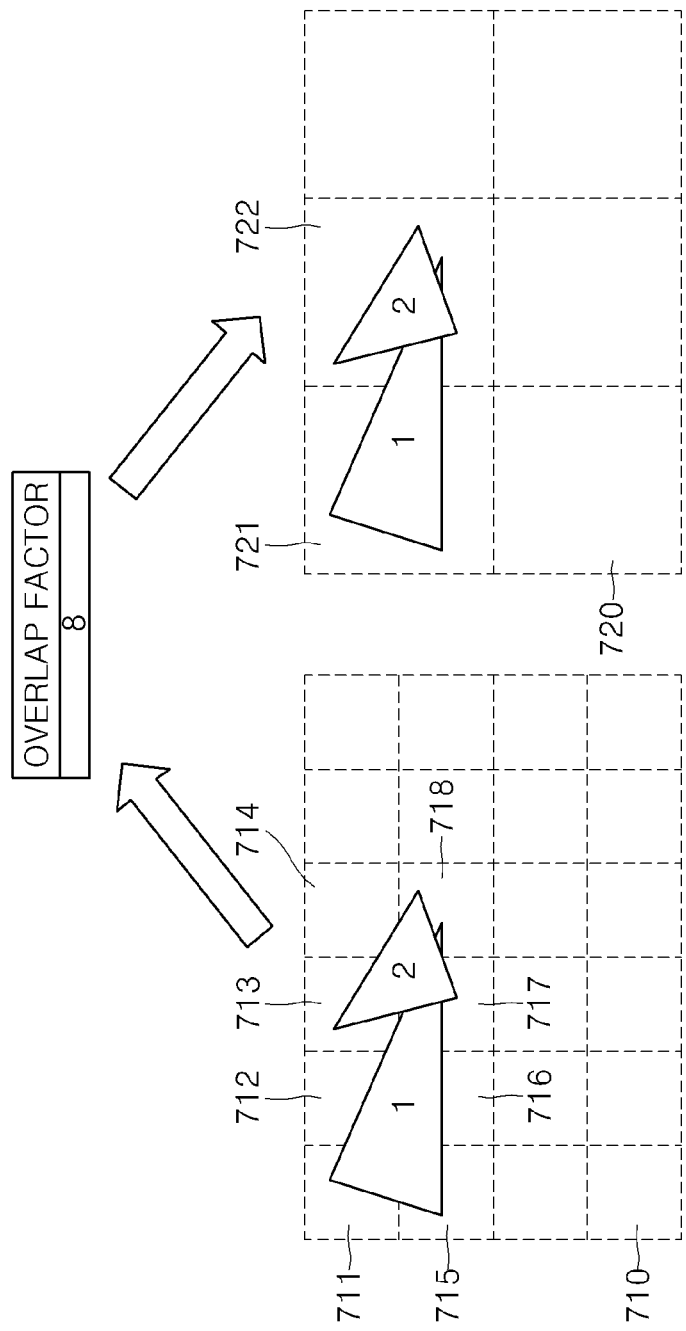
FIG. 7 is a diagram of a method of determining a tile size when the number of overlapping objects is less than the range, in accordance with an embodiment.

FIG. 7 is a diagram of a method of determining a tile size when the number of overlapping objects is less than a predetermined range, according to an embodiment of the present invention. In one illustrative example, the graphics data rendering apparatus of FIG. 1 may be configured to execute the operations of the graphics data rendering method described below and associated with FIG. 7.

As shown in FIG. 7, objects are equally distributed in tiles 711 to 718 of a first frame 710. In this case, a desired number of or additional pixel channels may be used to render each tile of the first frame 710.

The graphics data rendering method increases a tile size of a second frame 720, based on whether the number of overlapping objects calculated in the first frame 710 is less than a predetermined range. In continuous frames, characteristics of graphics data respectively constituting the frames are similar. As a result, the graphics data rendering method determines the tile size of the second frame 720 based on the number of overlapping objects calculated in the first frame 710.

The graphics data rendering method increases the tile size of the second frame 720 compared to the tile size of the first frame 710. As shown in FIG. 7, as a tile size is increased, a first tile 721 of the second frame 720 includes one object, and a second tile 722 includes two objects. In response to the number of overlapping objects calculated in the first frame 710 being less than the predetermined range, the graphics data rendering method increases the tile size of the first frame 710. As a result, inefficiency in which a desired number or more of pixel channels perform rendering is reduced.

Figure 8:
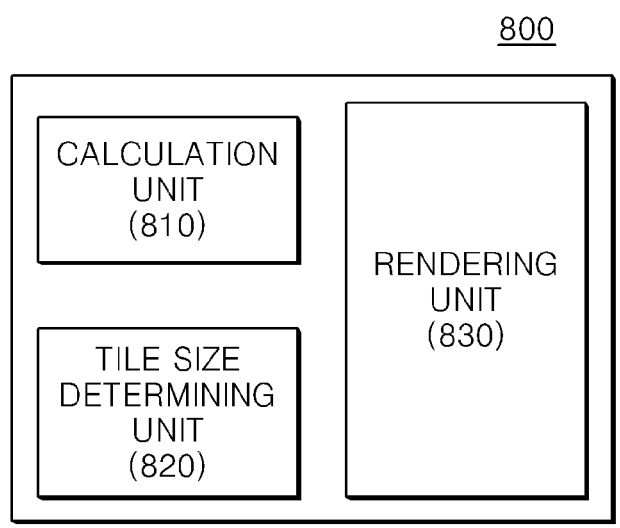
FIG. 8 is a block diagram of a graphics data rendering apparatus, in accordance with an embodiment.

FIG. 8 is a block diagram of a graphics data rendering apparatus 800, according to an embodiment.

Referring to FIG. 8, the graphics data rendering apparatus 800, according to an embodiment, includes a calculation unit 810, a tile size determining unit 820, and a rendering unit 830. Although each unit in the graphics data rendering apparatus 800 is illustrated as a separate unit from each other, a person of ordinary skill in the relevant art will appreciate that a single processor or controller may be configured to include the structure and the functionality of the calculation unit 810, a tile size determining unit 820, and the rendering unit 830. Alternatively, the graphics data rendering apparatus 800 may include additional elements, in addition to the illustrated structural elements.

Hereinafter, the elements will be described in detail.

The calculation unit 810 calculates a number of overlapping objects by tile in a first frame. The first frame may include graphics data displayed on a screen at a first timing.

The calculation unit 810 divides the first frame into a plurality of tiles, including a predetermined size, and renders each of the divided tiles. Referring to FIG. 1, in the graphics data rendering apparatus, tile information divided based on a predetermined size of each, some, or all of the divided tiles is transmitted to the tile scheduler 110. The tile scheduler 110 distributes the tiles to the at least one pixel channel 120, based on the divided tile information.

The calculation unit 810 calculates the number of overlapping objects on each of the divided tiles into which the first frame is divided.

The tile size determining unit 820 determines a tile size of a second frame, based on the calculated number of objects. The tile size determining unit 820, according to an embodiment, determines the tile size of the second frame, based on a result that is obtained by adding overlapping objects in the respective tiles included in the first frame. For example, when the number of the added objects exceeds a predetermined range, the tile size determining unit 820 decreases the tile size of the second frame. On the other hand, when the number of the added objects is less than the predetermined range, the tile size determining unit 820 increases the tile size of the second frame. In addition, when the number of the added objects is within the predetermined range, the tile size determining unit 820 determines the tile size of the second frame to the same size as the tile size of the first frame.

A tile size determining unit 820, according to another embodiment, the tile size of the second frame, based on the average number of overlapping objects in the respective tiles included in the first frame. For example, when the average number of the overlapping objects in the respective tiles included in the first frame exceeds the predetermined range, the tile size determining unit 820 decreases the tile size of the second frame. On the other hand, when the average number of the overlapping objects in the respective tiles included in the first frame is less than the predetermined range, the tile size determining unit 820 increases the tile size of the second frame. In addition, when the average number of the overlapping objects in the respective tiles included in the first frame is within the predetermined range, the tile size determining unit 820 determines the tile size of the second frame to the same size as the tile size of the first frame.

The tile size determining unit 820 stores tile size information in which a tile size is previously set based on a number of overlapping objects. For example, the graphics data rendering apparatus stores tile size information in which, when the number of overlapping objects is less than three, the tile size is set to a, and when the number of overlapping objects is equal to or greater than three and less than six, the tile size is set to b. The tile size determining unit 820 extracts tile size information, corresponding to the number of overlapping objects by tile, which is calculated from the first frame, from the database to determine the tile size of the second frame.

The rendering unit 830 divides the second frame, based on the determined tile size. When the determined tile size differs from the tile size of the first frame, the rendering unit 830 updates stored division information. The rendering unit 830 divides the second frame based on an updated tile size.

When the determined tile size is the same as the tile size of the first frame, the rendering unit 830 maintains the stored division information. The rendering unit 830 divides the second frame to the same size as the tile size of the first frame.

The rendering unit 830 renders the frame by divided tile. The rendering unit 830 transmits information about the divided tiles of the second frame to the tile scheduler 110 (see FIG. 1). In one illustrative example, the information about the divided tiles of the second frame includes size information of each of the divided tiles and index information including identification information for identifying each of the tiles.

The tile scheduler 110 (see FIG. 1) distributes a tile composing the second frame to the at least one pixel channel 120, based on the transmitted information about the divided tiles of the second frame.

As described above, according to the one or more of the above embodiments, the graphics data rendering method determines a tile size depending on a characteristic of graphics data to rendering the graphics data. Therefore, a rendering load is not unequally distributed in a certain tile, and rendering of the graphics data is efficiently performed.

The units and apparatuses described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

It is to be understood that in an embodiment, the operations in FIGS. 2, 4, and 5 are performed in the sequence and manner as shown although the order of some operations and the like may be changed without departing from the spirit and scope of the described configurations. In accordance with an illustrative example, a computer program embodied on a non-transitory computer-readable medium may also be provided, encoding instructions to perform at least the methods described in FIGS. 2, 4, and 5.

Program instructions to perform methods described in FIGS. 2, 4, and 5, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein may be easily construed by programmers skilled in the art to which the embodiments pertain based on and using the flow diagrams and block diagrams of the figures and their corresponding descriptions as provided herein.

To aid in understanding the present invention, reference numerals are used in the exemplary embodiments shown in the drawings, and specific terms are used to explain the exemplary embodiments of the present invention; however, they are not intended to limit the present invention and may represent all the components that could be considered by those of ordinary skill in the art.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A graphics data rendering method, comprising:
determining an initial tile size;
dividing a first frame into a plurality of first tiles according to the initial tile size;
calculating a plurality of overlapping object values associated with the plurality of first tiles, each overlapping object value of the plurality of overlapping object values indicating a quantity of overlapping objects in a separate first tile of the plurality of first tiles;
calculating an overlap factor based on the plurality of overlapping object values, based on performing one of,
 calculating a sum of the plurality of overlapping object values as the overlap factor, or
 calculating an average of the plurality of overlapping object values as the overlap factor;
determining an updated tile size of a second frame based on the overlap factor;
dividing the second frame into a plurality of second tiles according to the updated tile size, each second tile having the updated tile size; and
rendering the second frame by divided tile,
wherein each first tile of the plurality of first tiles has the same size as the initial tile size, and
wherein each second tile of the plurality of second tiles has the same size as the updated tile size.

2. The graphics data rendering method of claim 1, wherein the second frame is a frame onto which rendering is performed after the first frame.

3. The graphics data rendering method of claim 1, wherein,
the overlap factor is calculated as the sum of the plurality of overlapping object values, and
the determining of the updated tile size includes performing at least one of
 decreasing the initial tile size in response to the overlap factor exceeding a range, and
 increasing the initial tile size in response to the overlap factor being less than the range.

4. The graphics data rendering method of claim 1, wherein,
the overlap factor is calculated as the average of the plurality of overlapping object values, and
the determining of the updated tile size includes performing at least one of
 decreasing the initial tile size in response to the overlap factor exceeding a range, and
 increasing the initial tile size in response to the overlap factor being less than the range.

5. The graphics data rendering method of claim 1, wherein the determining of the updated tile size includes
comparing the overlap factor and the initial tile size that corresponds to the overlap factor by tile; and
determining the updated tile size of the second frame based on the initial tile size corresponding- to the overlap factor.

6. A non-transitory computer-readable storage medium storing a program for executing the graphics data rendering method of claim 1.

7. A graphics data rendering apparatus, comprising:
a processor configured to
    calculate a plurality of overlapping object values associated with a plurality of first tiles of a first frame, each overlapping object value of the plurality of overlapping object values indicating a quantity of overlapping objects in a separate first tile of the plurality of first tiles;
    calculate an overlap factor based on the plurality of overlapping object values, based on performing one of,
        calculating a sum of the plurality of overlapping object values as the overlap factor, or
        calculating an average of the plurality of overlapping object values as the overlap factor;
    determine an initial tile size of the first frame;
    determine an updated tile size of a second frame based on the overlap factor and the initial tile size;
    divide the first frame into the plurality of first tiles according to the initial tile size;
    divide the second frame into a plurality of second tiles according to the updated tile size, each second tile having the updated tile size; and
    render the second frame by divided tile,
    wherein each first tile of the plurality of first tiles has the same size as the initial tile size, and
    wherein each second tile of the plurality of second tiles has the same size as the updated tile size.

8. The graphics data rendering apparatus of claim 7, wherein the second frame is a frame for which rendering is performed after the first frame.

9. The graphics data rendering apparatus of claim 7, wherein,
    the overlap factor is calculated as the sum of the plurality of overlapping object values, and
    the processor is configured to perform at least one of
        decreasing the initial tile size in response to the overlap factor exceeding a range, and
        increasing the initial tile size in response to the overlap factor being less than the range.

10. The graphics data rendering apparatus of claim 7, wherein,
    the overlap factor is calculated as the average of the plurality of overlapping object values, and
    the processor is configured to perform at least one of
        decreasing the initial tile size in response to the overlap factor exceeding a range, and
        increasing the initial tile size in response to the overlap factor being equal to or less than the range.

11. The graphics data rendering apparatus of claim 7, wherein the processor compares the calculated overlap factor and the initial tile size that corresponds to the overlap factor by tile, and determines the updated tile size of the second frame based on the initial tile size corresponding to the calculated overlap factor.

12. A graphics data rendering method, comprising:
    calculating a plurality of overlapping object values associated with a plurality of first tiles in a first frame, each overlapping object value of the plurality of overlapping object values indicating a quantity of overlapping objects in a separate first tile of the plurality of first tiles;
    calculating an overlap factor associated with the first frame based on the plurality of overlapping object values, based on performing one of,
        calculating a sum of the plurality of overlapping object values as the overlap factor, or
        calculating an average of the plurality of overlapping object values as the overlap factor;
    comparing the overlap factor associated with the first frame against a range; and
    determining whether to modify or to maintain a tile size of a second frame depending on whether the overlap factor associated with the first frame is within the range;
    dividing the second frame into a plurality of second tiles according to a modified tile size in response to the determination; and
    rendering the second frame by divided tile,
    wherein each first tile of the plurality of first tiles has a same size as an initial tile size, and
    wherein each second tile of the plurality of second tiles has a same size as the modified tile size.

13. The graphics data rendering method of claim 12, further comprising:
    increasing the tile size of the second frame compared to the tile size of the first frame in response to the overlap factor associated with the first frame being less than the range.

14. The graphics data rendering method of claim 12, further comprising:
    maintaining the tile size of the second frame to be a same tile size as the tile size of the first frame in response to the overlap factor associated with the first frame being within the range.

15. The graphics data rendering method of claim 12, further comprising:
    decreasing the tile size of the second frame compared to the tile size of the first frame in response to the overlap factor associated with the first frame being greater than the range.

* * * * *